United States Patent [19]
Whittaker et al.

[11] Patent Number: 5,418,935
[45] Date of Patent: May 23, 1995

[54] APPARATUS FOR PREVENTING DOUBLE DRIVE OCCURRENCES ON A COMMON BUS BY DELAYING ENABLEMENT OF ONE DRIVER AFTER INDICATION OF DISABLEMENT TO OTHER DRIVER IS RECEIVED

[75] Inventors: Bruce E. Whittaker, Mission Viejo; Saul Barajas, Capistrano Beach; Leland E. Watson, Mission Viejo, all of Calif.

[73] Assignee: Unisys Corporation, Blue Bell, Pa.

[21] Appl. No.: 167,583

[22] Filed: Dec. 14, 1993

Related U.S. Application Data

[63] Continuation of Ser. No. 516,395, Apr. 30, 1990, abandoned.

[51] Int. Cl.⁶ .................. G06F 13/10; G06F 13/14; G06F 13/36
[52] U.S. Cl. .................. 395/550; 364/950.4; 364/271.5; 364/240.1; 395/275; 395/325; 395/725
[58] Field of Search .................. 395/550, 275

[56] References Cited

U.S. PATENT DOCUMENTS

| | | | |
|---|---|---|---|
| 4,446,382 | 5/1984 | Moore et al. | 307/241 |
| 4,686,396 | 8/1987 | Law et al. | 307/473 |
| 4,774,422 | 9/1988 | Donaldson et al. | 307/473 |
| 4,829,515 | 5/1989 | Donaldson et al. | 370/85.14 |
| 4,857,776 | 8/1989 | Khan | 307/473 |
| 4,941,126 | 7/1990 | Haubersin | 307/270 |
| 4,975,903 | 12/1990 | Wakerly et al. | 370/67 |
| 5,086,407 | 2/1992 | McGarity et al. | 395/800 |
| 5,086,427 | 2/1992 | Whittaker et al. | 370/85.1 |
| 5,097,483 | 3/1992 | Bechtolsheim | 395/800 |

*Primary Examiner*—Thomas C. Lee
*Assistant Examiner*—Rehana P. Krick
*Attorney, Agent, or Firm*—Alfred W. Kozak; Mark T. Starr; Stanton D. Weinstein

[57] ABSTRACT

In a digital data transfer system whereby a plurality of driver units are all connected to and share the same common system bus, there is provided control gating logic which will prevent the enablement of a subsequent driver for a fixed delay time until it is certain that the previous driver has been shut down. Due to switching time variations in driving units, a fixed delay time is set to function in a first driver that is beginning its data transmission to be sure that another driver which was previously transmitting data has been completely turned-off before the first driver gains access to the commonly shared bus. This ensures that no two drivers can simultaneously be driving data onto the system bus at the same time which would obviate the integrity of data transmitted.

4 Claims, 6 Drawing Sheets

APPARATUS FOR PREVENTING DOUBLE DRIVE OCCURRENCES ON A COMMON BUS BY DELAYING ENABLEMENT OF ONE DRIVER AFTER INDICATION OF DISABLEMENT TO OTHER DRIVER IS RECEIVED

This is a continuation of application Ser. No. 07/516,395 filed on Apr. 30, 1990, now abandoned.

FIELD OF THE INVENTION

This disclosure relates to systems where multiple data drivers share a common system bus for data transmission.

BACKGROUND OF THE INVENTION

A fundamental element of design in digital computers is the use of bi-directional data buses. This system discloses a design to provide reliable data transfer on high-speed digital computer bi-directional buses.

Figure 3:
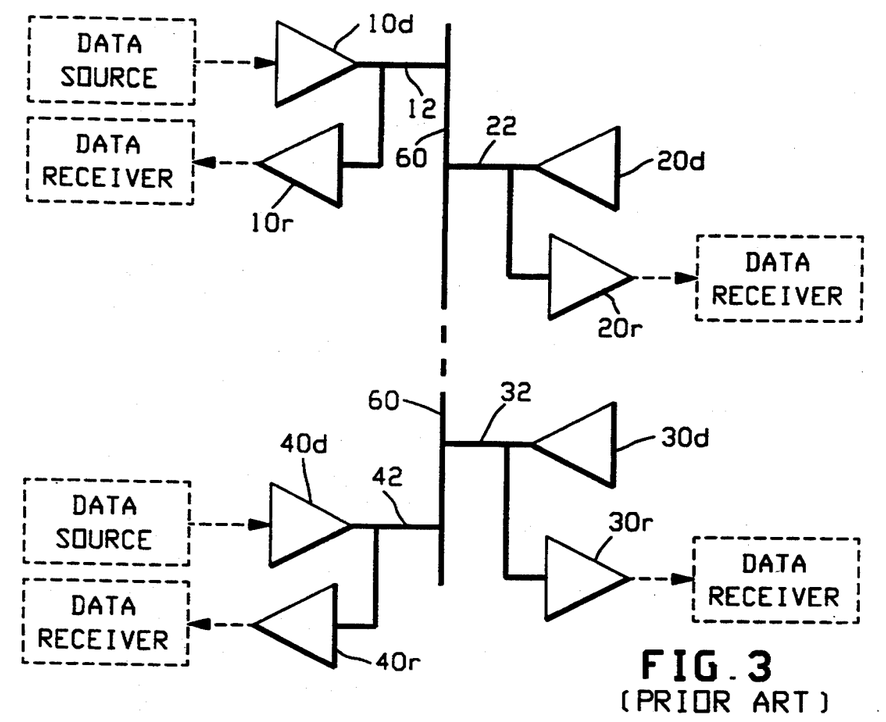
FIG. 3 is a schematic drawing showing a commonly shared bus which is used for data transfer between multiple numbers of drivers and receivers.

FIG. 3 shows a schematic drawing of a typical digital system bus 60. Modern digital computer systems require wide, high-speed, bi-directional data buses such that the bus 60 of FIG. 3 may, for example, be composed of eight bit lines which would make it a bus of eight bits wide. Likewise, other systems use 16-bit wide buses, and other systems may use 32, 48 and even 64-bit wide buses.

These buses, such as 60, will generally have several data sources and several data receivers on them. Each data source on the bus 60 will use "driver" circuit chips attached to the bus. These are shown schematically as drivers $10_d$, $20_d$, $30_d$, and $40_d$ in FIG. 3.

These drivers, when not attempting to be a transmitting-source of data on the bus, will-normally be "tri-stated". The tri-state condition of a driver means that it presents a very high impedance to the bus and electrically appears almost as though it were not present.

When a driver is "enabled" in order to present data onto the data bus 60, it is in its "active" state. In the active state it can "source" or "sink" a large quantity of electrical current. Further, with the present state of the art, the modern bus driver chips such as $10_d$, ... $40_d$ can switch on and off very rapidly,—for example, within a few nanoseconds.

In FIG. 3, each of the computer resources which use the bus will have its driver enabled, such as $10_d$, $20_d$, $30_d$, and $40_d$ respectively, in order to access the bus 60 and to drive data onto it. This is done via the connecting buses, 12, 22, 32, and 42 respectively.

Likewise, in FIG. 3, when a computer resource is enabled to "receive data" from the bus 60, it is done by means of the receivers such as $10_r$, $20_r$, $30_r$, and $40_r$, also through the respective bus connections 12, 22, 32, and 42 which connect to the shared bus 60.

If the situation should arise where more than one driver circuit on the data bus 60 is enabled to drive or dump data onto the bus at the same time, this is called "double drive".

Double drive presents a problem even for extremely small periods of times, even as small as a few nanoseconds, since this can present disturbances to the clean, clear flow of data on the data bus.

As the speed (clock rates) of digital systems increase, the effects of "double drive" become more dangerous to the integrity of data transfer operations. Thus it can be seen that the condition of double drive is a serious problem and requires solutions to enable data transfer with system integrity. The presently described system acts to provide a simple clean-cut and efficiently inexpensive solution to this problem.

Figure 4:
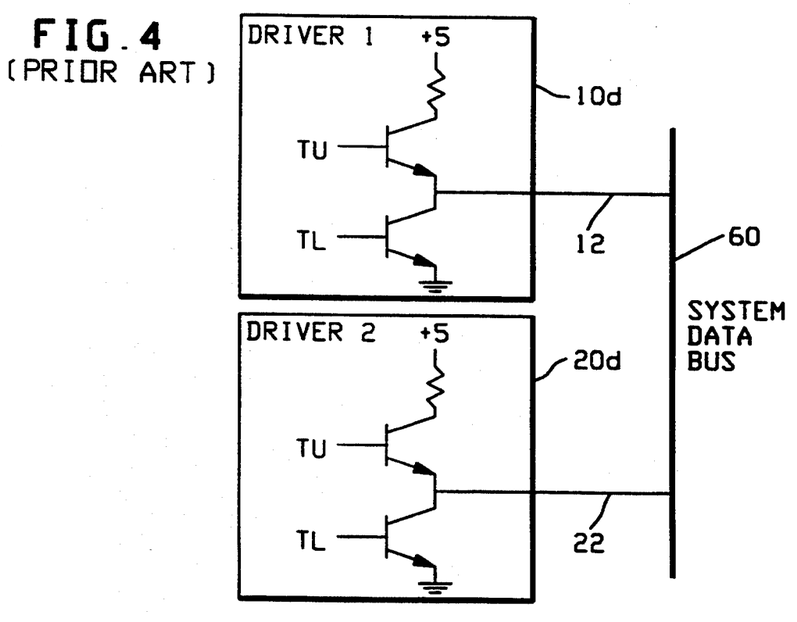
FIG. 4 is a schematic drawing of typical drivers using transistors.

The problem can be presented by means of the simplified circuit diagram of FIG. 4 which shows two driver circuits $10_d$ and $20_d$ connected to a common or shared bus 60. A data bus may be many bits wide. For example, it is not uncommon to have a 64-bit wide bus for data words.

For example since the entire width of a 56-bit bus (that is to say, each of the 56 lines) is normally switched together at the same time, it may be seen that not one, but many drivers are acting simultaneously in concert, and this provides another conditional situation which amplifies the problem of double drive.

With proper design standards, there is only one driver (that is, one set of source drivers of a bus width) which is allowed to be active on the bus at a given time. As seen in FIG. 4, if a driver is "on", then one of the two transistors (TU or TL) is "on". If TU is on, the driver is putting out a logical "one" (high voltage) onto the bus 60. If TL is on, the driver is putting out a logical "zero" (low voltage-ground) onto the bus.

It will, of course, be observed that if both of the drivers $10_d$ and $20_d$ are "on" simultaneously, and if one driver is putting out a logic "one" and the other driver is putting out a logic "zero", then the TU of the one driver is connected to the TL of the other driver. Thus this situation presents practically a dead short between the voltage source and ground. This will cause a very large electrical current to flow and cause a large current spike, which is the cause of many of the system problems associated with double drive and data corruption on the bus.

It should be indicated that FIG. 4 is merely representative in that there is a separate driver, $10_d$, for each bit-line of bus 12 so that actually $10_d$ represents an "associated set" of drivers for the various bit-lines constituting bus 12.

Similarly the second driver $20_d$ of FIG. 4 represents an "associated set" of drivers for the bit lines of bus 22 which conveys data to the shared system bus 60.

In FIG. 4, it may be noted that each transistor TU and TL operates like an on/off switch. When the transistor TU is "on", then the driver unit, $10_d$ and/or $20_d$, will output a logical "one".

When the transistor TL is "on", then any one of the drivers, $10_d$ and/or $20_d$ will output a logical "zero".

"Double-drive" occurs when the transistor TU of one driver is "on" at the same time that the transistor TL of another driver is also "on". Thus there is a time overlap of the "on-ness" of one driver such as $10_d$ with another driver such as $20_d$. This overlapping time period is destructive of the data on the bus 60.

When neither transistor TU or TL is "on", then the driver is put in a condition called "tri-state" which effectively isolates it from connection with the bus 60.

Figure 5:
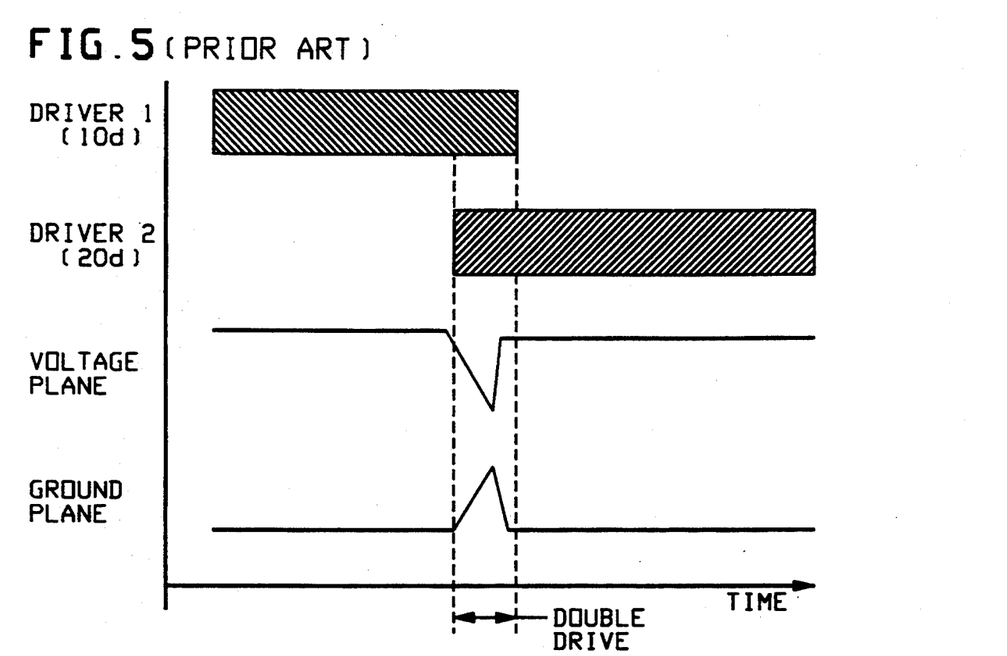
FIG. 5 is a timing chart showing problems that can occur due to two or more drivers overlapping their drive times into the common bus.

With reference to FIG. 5, there is seen a graph illustrating the "on" time of the first driver $10_d$ and the second driver $20_d$. Since there is an overlap in the "on" times of each of these drivers, it is seen that a spike occurs in the voltage plane and in the ground plane during the overlap period where the "double-drive" time occurs.

The overlap of the two drivers, being enabled simultaneously, can be of very short duration and yet still induce significant system problems on the data bus 60.

FIG. 5 indicates the first of several problems which are caused by double-drive on a system bus.

This first problem can be seen as a significant "glitch" on the system supply voltage (voltage plane) and a corresponding voltage spike on the system ground plane. These glitches are undesirable since they may induce noise into other signals and circuits as they propagate throughout the system, with the net result being a potentially unstable system. Failures caused by these type problems are intermittent and difficult to isolate and fix. Additionally, these type of problems can cause data corruption in a computer system which makes the system totally unacceptable.

Figure 6:
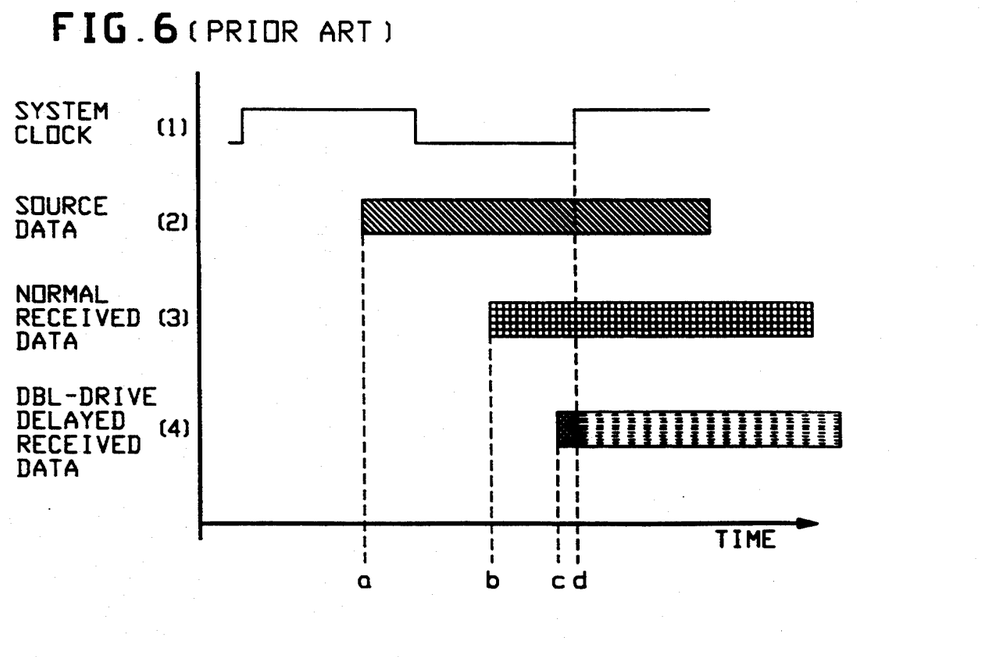
FIG. 6 is a clock diagram showing the necessity for delaying the received data to prevent double drive.

A second significant problem which may be introduced by the "double-drive" condition is the effect of "slowing down" of the system bus operation. During the time portion of the double-drive, data on the system bus is not stable or even valid for a receiving element to read. Thus, FIG. 6 indicates a "delay effect" caused by the double-drive condition. Line 1 of FIG. 6 shows the system clock periods of operation. Line 2 of FIG. 6 shows the period of time that source data from a transmittal point or transmittal source is available. Line 3 shows the time period during which data is normally received by a receiving unit. Line 4 indicates the delay of received data due to the double-drive condition.

In FIG. 6 it is assumed that data is received on the active (rising) edge of the clock, at time point "d".

The time period (a-b) is the normal propagation delay of the bus signals over the system bus.

The time period (b-d) is the time between the receipt of the data at the receiver and the next rising clock edge. This time is the safety margin for the received data. The receiving device will have a "set-up" time. (For some devices, one example being certain CMOS chips, the set-up time on signals is as great as 45 ns.) However, the safety margin must exceed the receiver's set-up time. For proper system design, the worst case signals and devices must be the design criteria.

In FIG. 6, the time period (b-c) is the additional delay on the received signal caused by the double drive. Compared to FIG. 5, this time period is the time of the glitch and its settling down time. The double drive has caused the bus data to effectively arrive (in a stable condition to be read) at time (c) instead of time (b). It can be seen, therefore, that the "safety margin" time for the receiver has been reduced from (b-d) to (c-d). If (c-d) is now less than the required set-up time of the receiving device, reliable data will not be received.

In modern high-speed computer systems, higher performance is achieved in part by making the clock speeds higher. This causes the clock period to be shorter, thus allowing less time for signal information and bus information to be propagated between logical sections of the system. And strictly by the nature of high-speed transmission lines, data buses require time in order to transmit a stable signal. Double-drive conditions increase the bus transmission time by at least a duration of the "drive overlap" between any two of the resource units connected to the bus. For efficiency purposes, this double-drive delay may put the bus delay over the limit and thus cause "bad" or corrupted data to be read by a receiving resource unit.

A third problem which may be introduced by the double-drive condition is the long term reliability of the bus drivers, such as $10_d$, $20_d$, ... $40_d$, etc. If the time period of the double-drive is too long, the drivers may actually be destroyed by the very high current coursing through them. But even short of this extreme situation, the more likely problem is that the short, very high current spikes will shorten the life of the driver chips. And this, of course, lowers the long term stability and reliability of the system.

Thus it can be seen that certain serious and undesirable results can be induced because of the double-drive condition. In some past system designs, the double-drive condition could often be easily ignored because (1) the clock rates were slower and thus allowed longer propagation and settling times; (2) the driver circuits were switched more slowly and thus sloppy logic design was masked by slow switching devices; and (3) very expensive voltage distribution schemes with very heavy copper voltage planes and extensive decoupling circuits were used in these older systems.

These mitigating influences are no longer available and valid for systems. The present day logic designer must prevent double-drive, in today's systems, through careful design techniques. Thus the present-system provides a solution which prevents the various intermittent data problems which used to be simply ignored or solved by very expensive voltage/ground plane support systems.

Figure 7:
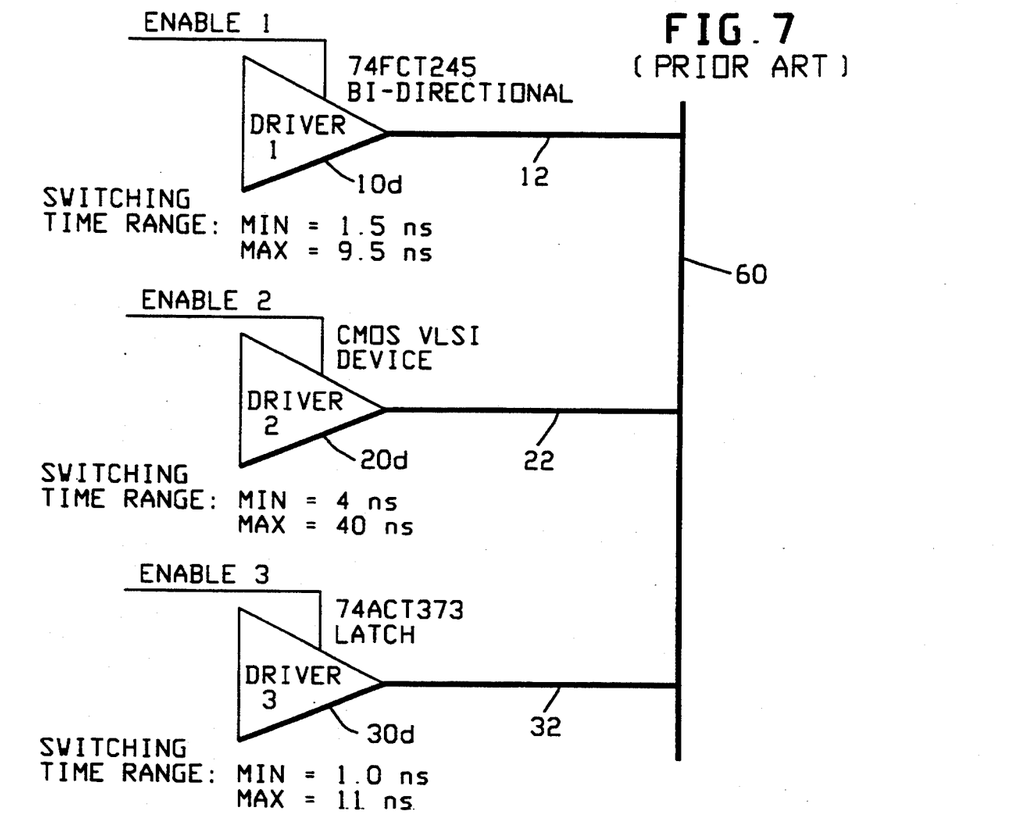
FIG. 7 is a schematic drawing showing the different switching times of different types of driver units.

Another situation that occurs is that of the usage of a variety of different types of drivers which have different switching times. FIG. 7 shows a system bus 60 with three different types of driver circuits. Each of the driver circuit units $10_d$, $20_d$, and $30_d$ are of a different circuit type. This variety becomes very typical as each type meets a different need.

The first driver $10_d$ (74FCT245 such as designated by Fairchild Semiconductor Company of 333 Western Ave., So. Portland, Me. 04106) is a bi-directional transceiver which allows data transfers in and out using a single chip type. The second driver $20_d$ (CMOS VLSI device) is a CMOS VLSI chip type. These are custom chips unique to certain specific designs. The third driver, $30_d$ (74ACT373) is a latch driver which holds data which is to be driven onto the bus 60. There are other possible driver types that also could be used but these are illustrative. It is worthy of notice to see that this variety of types of driver devices can increase the problem of double-drive conditions.

As seen in FIG. 7, the first driver $10_d$ has a minimum switching time range of 1.5 nanosecond and a maximum switching time range of 9.5 nanoseconds. The second driver $20_d$ has a minimum switching time range of 4 nanoseconds and a maximum switching time range of 40 nanoseconds, while the third driver $30_d$ has a minimum time switching range of 1.0 nanoseconds and a maximum time switching range up to 11 nanoseconds. Thus each driver circuit type has a different switching time characteristic. For some chip technologies, the range of the switching times is very broad. This makes "predicting" the time a driver will go "on" or go "off" of the bus 60, to be an inexact situation.

Figure 8:
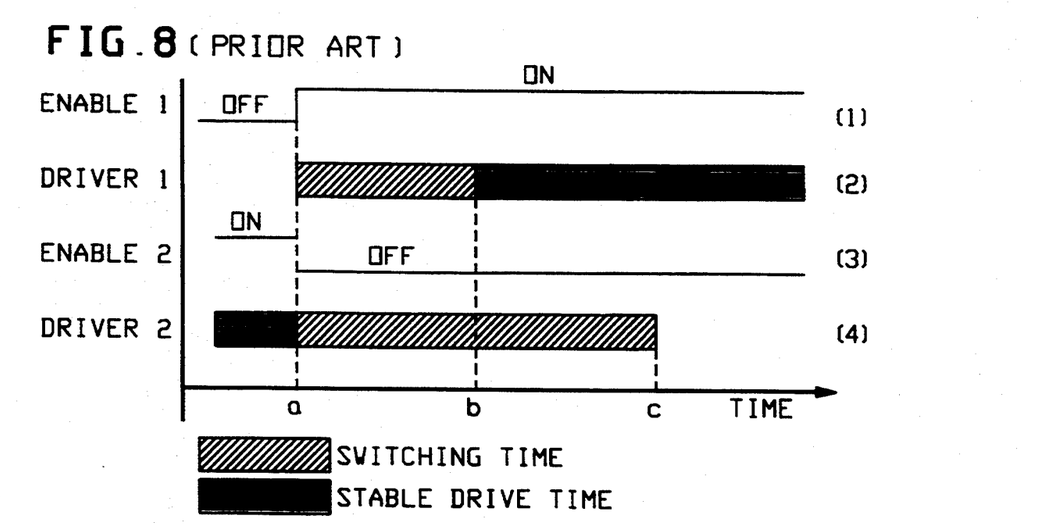
FIG. 8 is a timing diagram illustrating possible overlap in drivers switching times.

FIG. 8 shows an example of two drivers which are enabled/disabled at the exact same instant of time and yet may still cause a considerable spike of double-drive condition due to the switching time differences. As seen in FIG. 8, the first or top line shows the first driver switching from "off" to "on" to turn onto connection with the bus 60. Likewise, the second driver (shown on line 3) is transitioning from "on" to "off" in order to disconnect from connection with the bus 60. It is seen that the time period (a-b) is the switching time for the first driver to position from its "off" position to its "on"

position in order to connect to the bus. The actual switching may occur anywhere within the time period between a and b.

Likewise, (on the fourth line) it is seen that the second driver, which is switching from "on" the bus to "off" the bus, has a time period (a-c) which presents a time lag where it is unknown at what actual instant the disconnection will occur. Thus it is seen that the time period (a-b) is a period of uncertainty in which two of the drivers are in the process of transitioning and double drive problems can occur since both drivers may still be connected to the bus 60.

In addition to the variety of different driver circuit types, there occur the differences in the generation of the various "driver enable" signals which control the driver circuit units. Each driver signal has a unique group of logic functions within it. It also must propagate over its own unique logic path. Thus each driver is implemented in its own unique group of logic devices. These provide factors which combine to make exact control of the driver chips somewhat difficult to predict.

Figure 9:
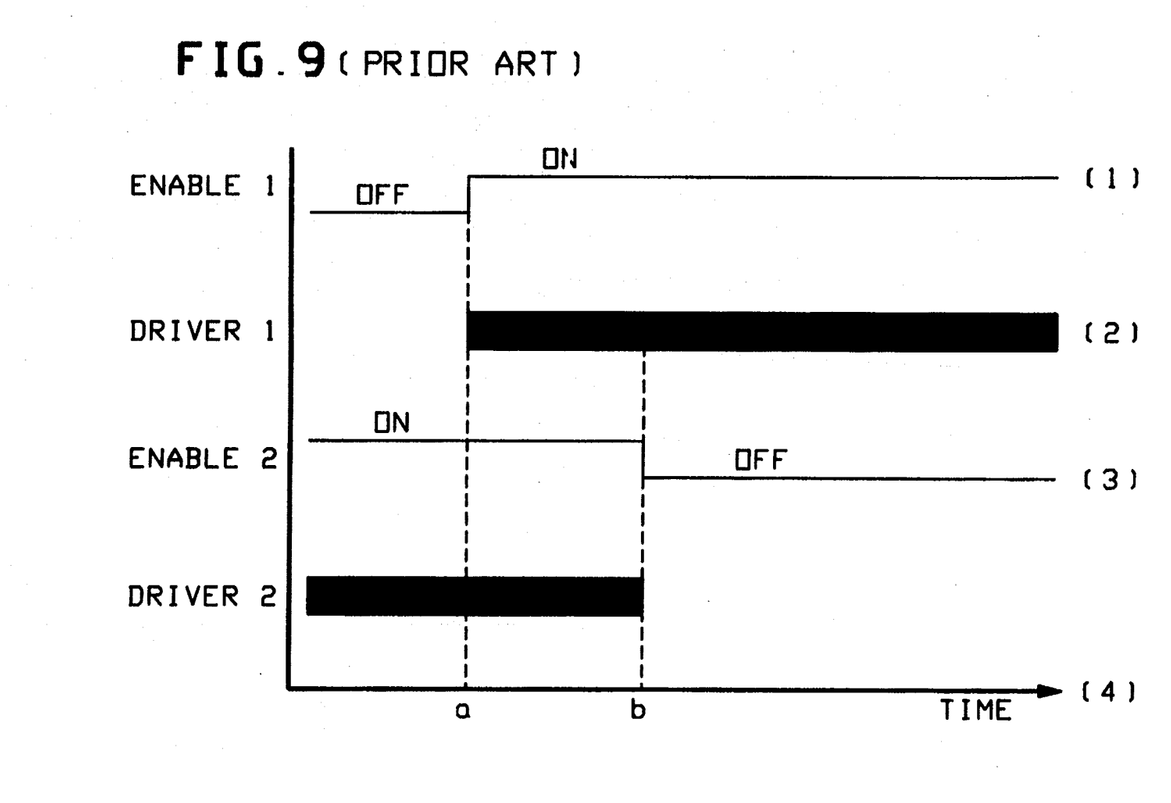
FIG. 9 is a timing drawing showing how two different drivers may be simultaneously operative on the common bus at the same time in an undesirable fashion.

FIG. 9 shows an example where the switching times of two drivers are assumed to be "instantaneous". But since the "enable" signals are actually different in time-occurrence, this also introduces the possibility of a double-drive condition.

For example, in FIG. 9, when the first driver is transitioning from "off" to "on", it must be initiated by the enable 1 signal shown in the top line of FIG. 9. Thus, at time (a) the first driver turns "on". Now when it is desired for the second driver to transition from the "on" to the "off" condition, it is seen that the enable 2 signal has a longer operation time (line 3) and does not operate until the time point b in order to turn off the second driver. Thus the time period (a-b) is the delay time of the enable 2 signal. Thus a condition is provided during the time period (a-b) where there is a possible double-drive condition.

By observation of FIG. 9, it can be deduced that one part of the solution to the double-drive problem is to always have a situation where the driver which is turning "off" precedes the driver which is turning "on". That is to say, the disconnection of a driver from the bus 60 should occur "before" the actual connection of the other driver onto the bus 60.

SUMMARY OF THE INVENTION

The system described herein presents a low-cost and certain solution to the problem of computer circuitry where a plurality of drivers can drive data onto a common system bus. As between any two different sets of driver units which drive data onto the bus, there is provided control gating logic circuitry which will ensure that only one of these drivers can be driving data onto the bus at any given period of time.

Thus, with any two groups of drivers in the system which connect to the data bus, at least one of these groups will have control gating logic having a fixed delay time in relationship to the other set of drivers which has a normal turn on time. Thus, when the second set of drivers is normally shut down, the first set of drivers cannot immediately drive data onto the commonly shared bus, but must be slightly delayed enough, before driving, to ensure that the original second group of drivers has been completely shut down. This is done by providing a fixed delay, such as a 100-nanosecond delay between the "shut down" of the second set of drivers and the "turn on" of the first set of drivers. Thus, any variation in the turn off or shut down time of a driver is obviated by permitting the delay to be long enough so that the next forthcoming driver unit will not "turn on" until it is certain that the previously turned on driver has been completely shut off.

DESCRIPTION OF PREFERRED EMBODIMENT

Figure 1:
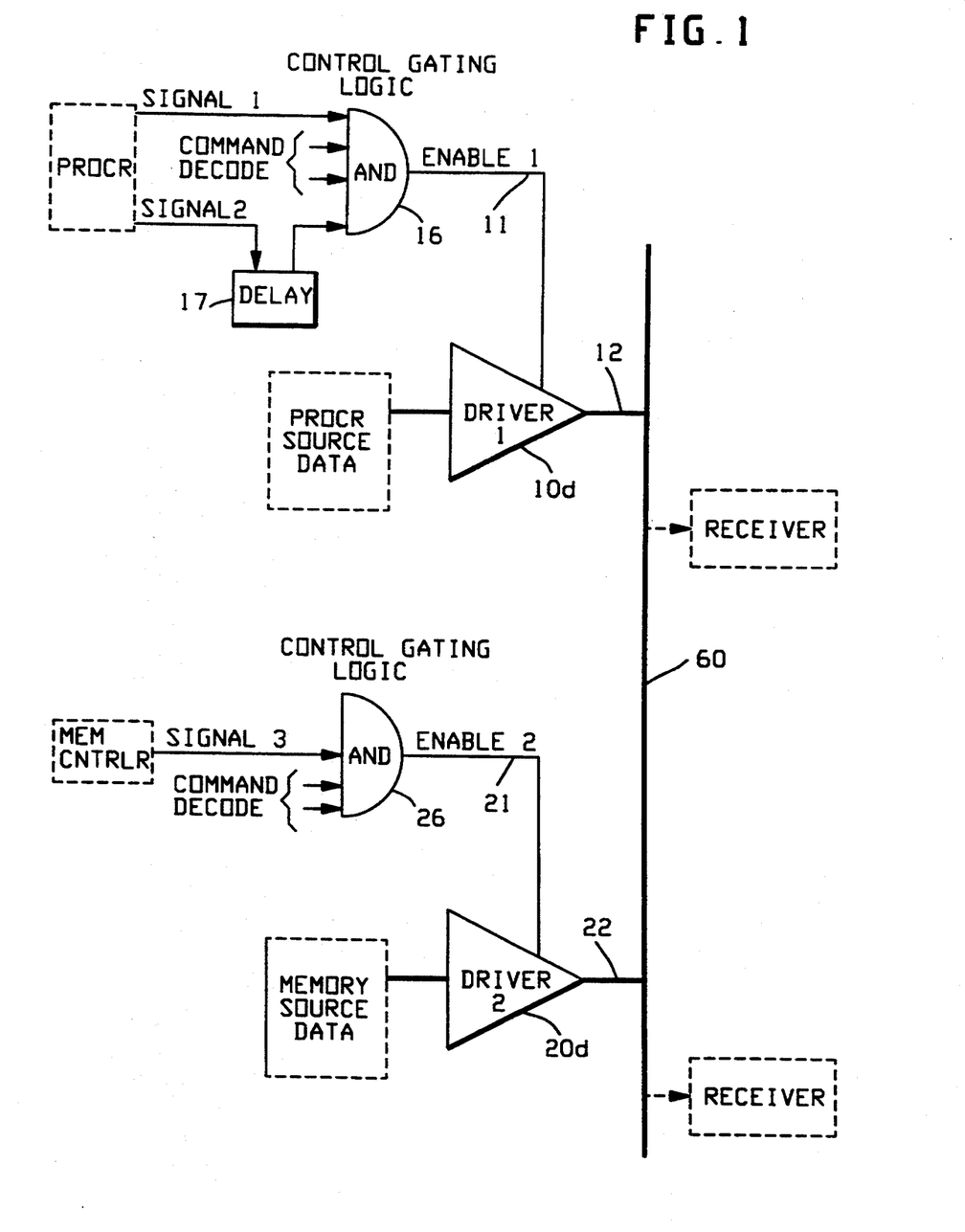
FIG. 1 is a diagram of the delay circuitry system which prevents any two or more separate groups of drivers from transmitting data on the shared common bus at the same time.

FIG. 1 is a schematic diagram illustrating the specialized delay device system for the prevention of double drive on the commonly shared bus 60. The system ensures that there will be a sufficient delay between the turning off of one data driver which has been driving data onto the bus 60 before the turning on of a second data driver which is to convey data on the bus 60.

As seen in FIG. 1, there is a representative driver unit or first driver unit $10_d$ connected via bit lines 12 to the bus 60. Likewise there is shown the second data driver $20_d$ which connects through bit lines 22 over to the commonly shared bus 60.

It should be indicated that the bit lines 12 and the bit lines 22 each represent, for example, a bus of 52 bit lines and each of these bit lines has its own individual first driver unit so that the item $10_d$ in FIG. 1 is a composite which actually represents a first group of separate drivers where there is one driver for each one of the 52 bit lines. Thus $10_d$ could represent a group of 52 drivers.

Likewise, the second driver $20_d$ is a composite which also represents a second group of 52 drivers, one for each of the 52 bit lines of the bus 22. Thus $20_d$ could represent a group of 52 drivers.

As seen in FIG. 1, there is a block labeled "Processor Source Data". This represents address data which comes from the processor unit. Then a second block designated "main memory source data" provides information which comes from the main memory unit. These data transfers are controlled by the first group and second group of drivers at appropriate times in order to drive data onto the commonly shared bus 60.

As further seen in FIG. 1, each of the first set of drivers $10_d$ are enabled by a first enable control line 11.

Likewise the second set of drivers 20$_d$ are enabled by a second enable control line 21.

The first enable line 11 is provided by the output of the AND gate 16. The AND gate 16 has a number of inputs among which are some command decoder lines and the signal 1 input and the signal 2 input. The signal 1 and signal 2 inputs are provided by control logic in the processor card unit involved. On the signal 2 line, there is seen a delay unit 17 which provides a present delay which, for example, may be a 100 nanosecond delay. The output of unit 17 provides a delayed signal 2 and applies it to the AND gate 16.

The second enable line 21 is provided by the output of the AND gate 26 which gate has a number of input lines including a set of command decoder lines and also a signal 3 input line. The signal 3 input line comes from the memory controller of the system.

In order that the first set of 52 drivers (10$_d$) be activated, it is necessary that the first enable line 11 be activated by the control gating logic from gate 16. Since the AND gate 16 can only provide its output when all of its input signals have been activated, it will be seen that the delayed signal 2 line will cause at least a predetermined (which could be a 100 nanosecond) delay in the activation of the first enable line 11. Thus, basically, there will be no output from the first enable line 11 until the delayed signal 2 is activated at the same time that the signal 1 is activated.

The second set of 52 drivers represented by 20$_d$ is activated for transmission of memory source data onto the bus 60 only after the second enable signal 21 is turned on by the AND gate 26 which is activated by the signal 3 from the memory controller.

Thus, as between any two sets of drivers attached to the commonly shared bus 60, it is seen that least one of these groups of drivers must by controlled by the signal 1 and signal 2 from the control logic of the processor card together with the predetermined (100 nanosecond) delay line unit 17 on the signal 2 line. This will ensure that after the end of transmission by the second driver set, the first driver set cannot transmit until a suitable delay time after shut off of the second driver set.

Figure 2:
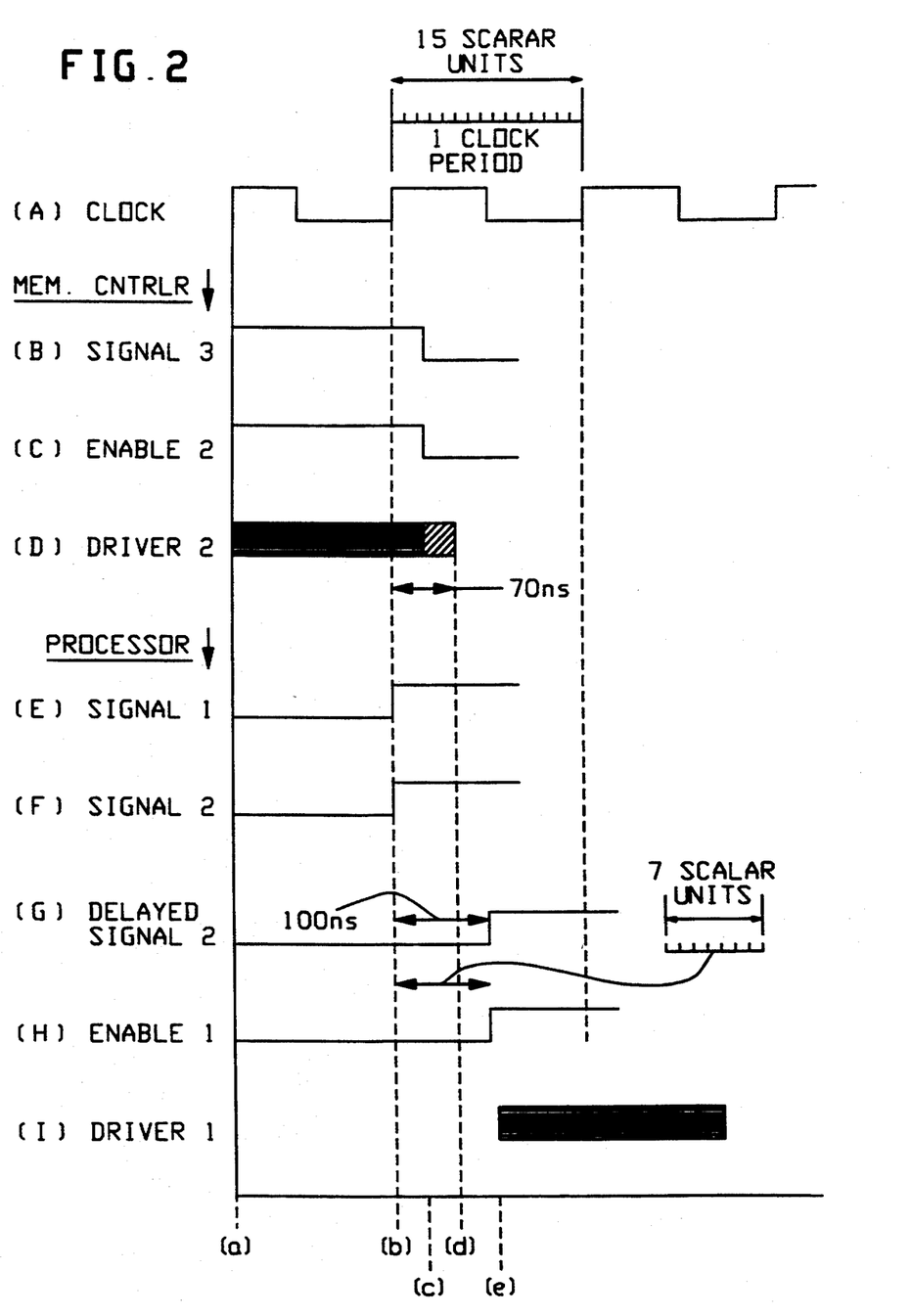
FIG. 2 is a timing diagram showing how the circuitry delay system as between two different drivers operates to insure that one driver is shut off before a second driver can access the shared common bus.

Referring to FIG. 2, the operational effect of the specialized delay circuitry of FIG. 1 will be illustrated through a set of timing diagrams with lines designated A through I.

The basic clock signal involved is shown in line A. The memory controller which activates signal 3 to the AND gate 26 is shown in line B.

It is seen that the signal 3 is "ON" and also the second enable signal is also "ON" during the period (a)-(c). This further indicates that the second driver set, line D, is on for the period (a)-(c). At the time moment (c), the signal 3 and the second enable line shuts off with the purpose of shutting down the second driver (line D). However, due to variance in drivers, there is no certainty that the second driver (or set of drivers) will shut off at the exact moment desired. Thus, there is a period of uncertainty during the time (c)-(d) where it is unknown when and how the second driver will have completely shut down. One assumption often made is that the time period (b)-(d) will require at least 70 nanoseconds for complete shut down of the second driver to occur.

Now, assuming that the second driver (set of drivers 20$_d$) has been attempted to be terminated, it is essential that the first set of drivers will not be activated until it is absolutely certain that the second set of drivers has been fully terminated. To this end, it is seen at line E and line F that the signal 1 and signal 2 lines are activated at the time period (b) which represents the rising clock signal corresponding to line A. Then, because of the delay line circuitry 17 introduced in signal 2, it is seen, at line G, the delayed signal 2 which has been delayed, for example, a period of 100 nanoseconds. This means that the first enable line on H cannot activate until 100 nanoseconds after the clock rise signal and thus, the first enable signal (line H) is also thus delayed by 100 nanoseconds with the result that (line I) the first set of drivers 10$_d$ will only then be activated at (e) for the purpose of transferring source data onto the bus 60 with the "full certainty" that the second set of drivers 20$_d$ have all been turned "off" and there is no possibility of a double drive of data onto the bus which would ruin the integrity of the data transfer in the system. Thus the time period from (d) to (e) of FIG. 2 provides and additional window of safety.

Normally there are numerous driver sets which share the system bus. The transition situation occurs between an active driver switching "off" and an inactive driver switching "on". It is the function of the normal control signals (Signal 1 and Signal 3, FIG. 1) to ensure that only one driver set (as 10$_d$ in FIG. 1) is being enabled for a "turn-on" at the proper moment via enable line 11.

The delay line is required because of the 70 nanosecond sloppiness of the memory subsystem. All other driver sets (there might be several) that must drive immediately following the memory controller drivers having driver sets (as driver 20$_d$, FIG. 1), must have the same delay line logic 17 shown in FIG. 1.

Other driver sets may not need delays between themselves, but only as they relate to and follow the memory controller. It may be noted that the "safety period" provided in this configuration is less than one clock time with the result that there is provision for wider band pass and higher throughput than configurations which might require a full clock time delay.

Described herein has been a reliable and low-cost circuitry system for the prevention of double drive problems when multiple data drivers share a common bus for transmitting data. Thus the integrity and reliability of transferred data is more firmly insured in addition to enhancement of system operation.

While other forms of this protective concept may be implemented, it is to be understood that the invention is defined by the following claims.

What is claimed is:

1. A double drive prevention system for a common system bus means comprising in combination:
   (a) a common system bus means connected to receive data transmitted from a first driver unit and a second driver unit;
   (b) said first driver unit being enabled by an enablement signal from a first control gating logic means;
   (c) said second driver unit being disabled via a disablement signal from a second control gating logic means;
   (d) processor control means for initiating said enablement signal to said first control gating logic means to inform the processor that said enablement signal may be applied to delay means;
   (e) memory controller means for initiating said disablement signal to said second control gating logic means and to said processor control means;
   (f) delay means for delaying said enablement signal from said processor control means to said first control gating logic means in order to ensure that said second driver unit has been disabled and turned-off before turn-on of said first driver unit in transmitting data to said common system bus means.

2. A digital system for insuring that no more than one source module means is transmitting onto a common bus at any moment in time, said system comprising:
  (a) a first set of driver units connected to transmit data from a processor onto said common bus;
  (b) a first driver control means for initiating an enablement signal to said first set of driver units and including:
    (b1) means to receive processor control commands from said processor after said processor has received indication of a disablement signal being applied to a second set of driver units;
    (b2) means to delay, by less than a single clock period the said enablement signal to said first set of driver units wherein said enablement signal to said first set of driver units is inhibited until said second set of driver units is inoperative;
  (c) said second set of driver units connected to transmit data from a memory means to said common bus;
  (d) a second driver control means for initiating said disablement signal to said second set of driver units and including:
    means to receive memory control commands from said memory means;
  (e) said source module means including:
    (e1) said processor for transmitting said processor control commands to said first driver control means in response to said indication of said disablement signal from said memory means;
    (e2) said memory means for transmitting said memory control commands to said second set of driver units and including:
      (e2a) means to convey said indication of said disablement signal to said processor.

3. The system of claim 2 wherein said means to delay the said enablement signal to said first set of driver units includes:
  (b2a) means to transmit said enablement signal to said first set of driver units approximately 100 nanoseconds after receipt, by said processor, of said indication of said disablement signal to said second set of driver units.

4. The system of claim 2 wherein said means to delay the said enablement signal to said first set of driver units includes:
  (i) delay circuit means which is predeterminedly settable to provide a delay period which is always greater than the known time period for rendering inoperative said second set of driver units.

* * * * *